US007602103B2

(12) United States Patent
Moriya et al.

(10) Patent No.: US 7,602,103 B2

(45) Date of Patent: Oct. 13, 2009

(54) ULTRASONIC MOTOR

(76) Inventors: Tadashi Moriya, 8, Matsukazedai, 1-chome, Aoba-ku, Yokohama-shi, Kanagawa (JP); Yuji Furukawa, 57-11, Shimoishihara 3-chome, Chofu-shi, Tokyo (JP)

( * ) Notice: Subject to any disclaimer, the term of this patent is extended or adjusted under 35 U.S.C. 154(b) by 0 days.

(21) Appl. No.: 11/596,629

(22) PCT Filed: Apr. 27, 2005

(86) PCT No.: PCT/JP2005/008546

§ 371 (c)(1), (2), (4) Date: Aug. 6, 2007

(87) PCT Pub. No.: WO2005/114824

PCT Pub. Date: Dec. 1, 2005

(65) Prior Publication Data

US 2008/0001500 A1 Jan. 3, 2008

(30) Foreign Application Priority Data

May 21, 2004 (JP) ............................ 2004-151313

(51) Int. Cl.
*H02N 2/10* (2006.01)

(52) U.S. Cl. ............................ 310/323.04; 310/323.12

(58) Field of Classification Search ................. 310/323, 310/323.04

See application file for complete search history.

(56) References Cited

U.S. PATENT DOCUMENTS

| | | | | |
|---|---|---|---|---|
| 4,827,487 | A * | 5/1989 | Twerdochlib | 374/152 |
| 6,771,919 | B2 * | 8/2004 | Koide | 399/167 |
| 2001/0043864 | A1 * | 11/2001 | Maruyama et al. | 417/44.1 |
| 2002/0175582 | A1 * | 11/2002 | Lopatinsky et al. | 310/156.01 |
| 2005/0081365 | A1 * | 4/2005 | Gorohata et al. | 29/596 |
| 2005/0127782 | A1 * | 6/2005 | Endo et al. | 310/323.02 |

FOREIGN PATENT DOCUMENTS

| | | |
|---|---|---|
| JP | 63-150062 A | 6/1988 |

(Continued)

OTHER PUBLICATIONS

J.L. Pons, H. Rodriguez, R. Ceres, and L. Calderón, Novel Modeling Technique for the Stator of Traveling Wave Ultrasonic Motors, IEEE Transactions on Ultrasonics, Ferroelectrics, and Frequency Control, vol. 50, No. 11, Nov. 2003.

(Continued)

*Primary Examiner*—Walter Benson
*Assistant Examiner*—Bryan P Gordon
(74) *Attorney, Agent, or Firm*—Rader, Fishman & Grauer PLLC; Toshikatsu Imaizumi

(57) ABSTRACT

The present invention relates to an ultrasonic motor comprising a stator formed by using an acoustic waveguide of helical coil shape or an acoustic waveguide of in-plane spiral coil shape, so that a rotor placed in close proximity to, or in close contact with the coil is rotated, traveled, or performed curved line movement by the propagation of the wave on the stator, thereby eliminating the provision of a preload spring and an absorber, simplifying the structure of the motor, reducing the size of the motor, and enabling to work in a liquid environment without water proofing and rotation of a hollow tube.

19 Claims, 14 Drawing Sheets

FOREIGN PATENT DOCUMENTS

| | | | |
|---|---|---|---|
| JP | 04-111291 | U | 9/1992 |
| JP | 7-88788 | A | 4/1995 |
| JP | 10-85221 | A | 4/1998 |
| JP | 10-296186 | A | 11/1998 |
| JP | 2000-102271 | | 4/2000 |
| JP | 2002-306491 | A | 10/2002 |
| JP | 2003-510158 | A | 3/2003 |
| JP | 2003-116869 | A | 4/2003 |
| JP | 2003-527155 | A | 9/2003 |
| JP | 2004-336956 | A | 11/2004 |
| JP | 2005-74361 | A | 3/2005 |

OTHER PUBLICATIONS

R. Carotenuto, A. Iula and G. Caliano, Flexible piezoelectric motor based on an acoustic fiber, Applied Physics Letters, vol. 77, No. 12, Sep. 18, 2000.

B. Chen, B.A. Cheeseman, A. Safari, S.C. Danforth and Tsu-Wei Chou, Theoretical and Numerical Predictions of the Electromechanical Behavior of Spiral-Shaped Lead Zirconate Titanate (PZT) Actuators, IEEE Translations on Ultrasonics, and Frequency Control, vol. 49, No. 3, Mar. 2002.

K. Uchino, Piezoelectric Actuatorsand Ultrasonic Motors, Kluwer Academic, Boston 1977.

T. Moriya, Y. Furukawa, A. Nakajima, and Y. Akano, Development of a Miniature Ultrasonic Motor Using a Helical Coil as a Stator, 2005 IEEE Ultrasonics Symposium.

T. Moriya, Y. Furukawa, Y. Akano and A. Nakajima, Experimental Study on a Miniature Ultrasonic Motor Using a Coiled Stator, IEICE Technical Report US2005-29 (Jul. 2005).

A. Nakajima, Y. Furukawa and T. Moriya, "Propagation of Ultrasonic Wave on a Coiled Waveguide and its Application to a Micro-Motor," The First International Workshop on Ultrasonic Motors and Actuators, Nov. 14-15, 2005, Yokohama, Japan.

K. Asai and M.K. Kurosawa, Simulation Model pf Surface Acoustic Wave Motor Considering Tangential Rigidity, IEICE translation A vol. J85-A No. 12, pp. 14281439, Dec. 2002.

T. Morita, M.K. Kurosawa and T. Higuchi, A cylindrical shaped micro ultrasonic motor utilizing PZT thin film (1.4 mm in diameter and 5.0 mm long stator transducer), Sensors and Actuators A 83(2000) 225.230.

M. Morita, Miniature piezoelectric motors, Sensors and Actuators A 103(2003) 291-300.

T. Kanda, A. Makino, K. Suzumori, T. Morita and M.K. Kurosawa, A Cylindrical Micro Ultrasonic Motor Using a Micro-machined Bulk Piezoelectric Transdeucer, 2004 IEEE Ultrasonics Symposium.

T. Maeno, T. Tsukimoto and A. Miyake, Finite-Element Analysis of the Rotor/Stator Contact in a Ring-Type Ultrasonic Motor, IEEE Transactions on Ultrasonics, Ferroelectrics, and Frequency Control, vol. 39, No. 6, Nov. 1992.

S. Dong, S.P. Lim, K.H. Lee, J. Zhang, L.C. Lim and K. Uchino, Piezoelectric Ultrasonic Micromotor with 1.5 mm Diameter, IEEE Transactions on Ultrasonics, Ferroelectrics, and Frequency Control, vol. 50, No. 4, Apr. 2003.

T. Morita, M.K. Kurosawa and T. Higuchi, A Cylindrical Micro Ultrasonic Motor Using PZT Thin Film Deposited by Single Process Hydrothermal Method (ø2.4mm, L:10mm Stator Transducer), IEEE Transactions on Utrasonics, Ferroelectrics, and Frequency Control, vol. 45, No. 5, Sep. 1998.

M. Dubois and P. Muralt, PZT Thin Film Actuated Elastic Fin Micromotor, IEE Transactions on Ultrasonics, Ferroelectrics, and Frequency Control, vol. 45, No. 5, Sep. 1998.

J.T. Leinvuo, S.A. Wilson and R.W. Whatmore, Flextensional Ultrasonic Motor Using the Contour Mode of a Square Piezoelectric Plate, IEE Transactions on Ultrasonics, Ferroelectrics, and Frequency Control, vol. 51, No. 8, Aug. 2004.

Y. Ming, R.C. Richardson, M.C. Levesley, P.G. Walker and Kevin Watterson, Performance Improvement of Rectangular-Plate Linear Ultrasonic Motors Using Dual-Frequency Drive, IEE Transactions on Ultrasonics, Ferroelectrics, and Frequency Control, vol. 51, No. 12, Dec. 2004.

M. Aoyagu, S.P. Beeby and N.M. White, A Novel Multi-Degree-of-Freedom Thick-Film Ultrasonic Motor, IEE Transactions on Ultrasonics, Ferroelectrics, and Frequency Control, vol. 49, No. 2, Feb. 2002.

International Search Report dated Aug. 23, 2005.

Sadayuki Ueha et al., "Ultrasonic Motor", Ceramics 21, No. 1, pp. 12-14, Japan (1986).

Sadayuki Ueha et al., "Ultrasonic Motor", Ceramics 21, No. 1, pp. 9-14, Japan (1986).

R. Carotenuto et al., "*Flexible piezoelectric motor based on an acoustic fiber*", Applied Physics Letters, vol. 77, No. 12, pp. 1905-1907 (Sep. 18, 2000).

S. Iwamatsu et al., "*Rotary Ultrasonic Motor using Extensional Vibration of a Ring*", Japanese Journal of Applied Physics, vol. 25, Supplement 25-1, pp. 174-176 (1986).

K. Uchino et al., "*Micromechatronics*", Chapter 10, Ultrasonics Motor Applications, pp. 417-430, Marcel Dekker Inc., (2003).

Office Action of Japanese Patent Application No. 2006-513683 mailed Jul. 28, 2009 (Japan).

Office Action of Chinese Patent Application No. 2005800141615 issued on May 8, 2009 (China).

* cited by examiner (a)

(b)

ULTRASONIC MOTOR

TECHNICAL FIELD

The present invention relates to an ultrasonic motor that uses a stator in the form of a coil for use in the fields of medicine and industry.

BACKGROUND ART

Ultrasonic motors or actuators find many applications in the field of mechanical engineering such as in robotics, electric motors, in the field of medicine such as diagnosis and therapy, and in the field of measurements that must be free from electro magnetic interference. The motors for use in medicine such as in intravascular ultrasound (IVUS) and thrombectomy require the following characteristics, because the motors are used inside a vessel:

(a) The motor must be as small as possible, typically 1 mm in diameter and 5 mm in length.

(b) The motor should work in a liquid environment.

(c) The rotor should be a hollow tube.

Conventional motors can be evaluated as follows from the viewpoint of said requirements:

Traveling wave type ultrasonic motors are widely used in robotics and in cameras because they have an advantage over conventional electro-magnetic motors because of excellent characteristics such as large torque for their size and low speed. The basic principle of the traveling wave type ultrasonic motor is as follows. When the ultrasonic wave (the Lamb wave) propagates along a slab (stator), surface particles of the slab move elliptically. Therefore, if the mover or rotor is pressed against the slab using a spring, the mover is driven in the opposite direction of the wave direction due to friction.

In the conventional traveling wave type ultrasonic motors, there are two types of configurations. In type A, a plate is used as an acoustic waveguide, and in type B, a ring in a plane is used as a waveguide. In these motors, the ultrasonic wave propagates in a plane. Therefore, the contact region between the stator and the rotor is short. Therefore, a spring is used to apply sufficient preload. Therefore, the conventional traveling wave type ultrasonic motors have the following drawbacks:

(a) Use of a spring for the application of the preload prevents a decrease of the size of the motor.

(b) This motor does not work in a liquid environment. In type B, water proofing is necessary for use in water.

(c) In type B, the rotor can be a hollow tube. However, an increase of the thickness in the radial direction prevents its use inside a vessel. In type A, a hollow tube cannot be used as a rotor.

In conclusion, the conventional traveling wave type ultrasonic motors do not satisfy the said requirements (See J. L. Jones, H. Rodriguez, R. Ceres, and L. Calderon, "Novel Modeling Technique for the Stator of Traveling Wave Ultrasonic Motors," IEEE Transactions of Ultrasonics, Ferroelectrics, and Frequency Control, Vol. 50, No. 11, pp. 1429-1435, November 2003)

Apart from the traveling wave type ultrasonic motor, there are some types of ultrasonic motors that can be miniaturized. For example, a motor that uses vibration at the top of a fiber can be miniaturized, because it does not use a spring. However, it cannot be used in water because it is difficult to vibrate the fiber in water at a high speed. Furthermore, it is difficult to use a hollow tube as a rotor (See R. Carotenuto, A. Lula, and G. Galiano, "Flexible Piezoelectric Motor based on Acoustic Fiber," Applied Physics Letters, Vol. 27, No. 12, pp. 1905-1907, 2000).

SUMMARY OF THE INVENTION

The object of the present invention is to solve the following problems occurring in the conventional traveling wave type ultrasonic motor:

(a) The conventional traveling wave type ultrasonic motor cannot work without using a preload spring, thus preventing the further reduction in its size.

(b) The conventional traveling wave type ultrasonic motor cannot work in a liquid environment unless appropriate waterproofing is provided.

(c) A hollow tube cannot be used as a rotor inside a vessel.

The invented motor operates as a transmission type ultrasonic motor. The motor uses a coiled waveguide in the shape of a helical coil as a stator. The use of a coiled stator enables driving the rotor in a wide range of interfaces between the rotor and the stator. Therefore, the rotor can be driven with a small preload, making a preload spring unnecessary.

The motor has the following features:

(a) The motor can be extremely miniaturized. Even the use of a carbon nano-coil may be considered.

(b) The motor can be used in a liquid environment.

(c) A hollow tube can be used as a rotor.

(d) The rotor can be linearly displaced if the helical groove is provided on the rotor.

(e) Any axisymmetric object such as a sphere, a cone, or an ellipse can be rotated.

(f) A rod and a hollow tube can be moved along the axis of the mover.

DETAILED DESCRIPTION OF THE PREFERRED EMBODIMENTS

The Principle of Operation of the Conventional Traveling Wave Type Ultrasonic Motor First, since the principle of operation of the motor of this invention is the same as that of the conventional traveling wave type ultrasonic motor, the principle of operation of it is described. Here, attention is first paid to the displacement at each point on the surface when a flexural wave traveling along a slab.

Figure 1:
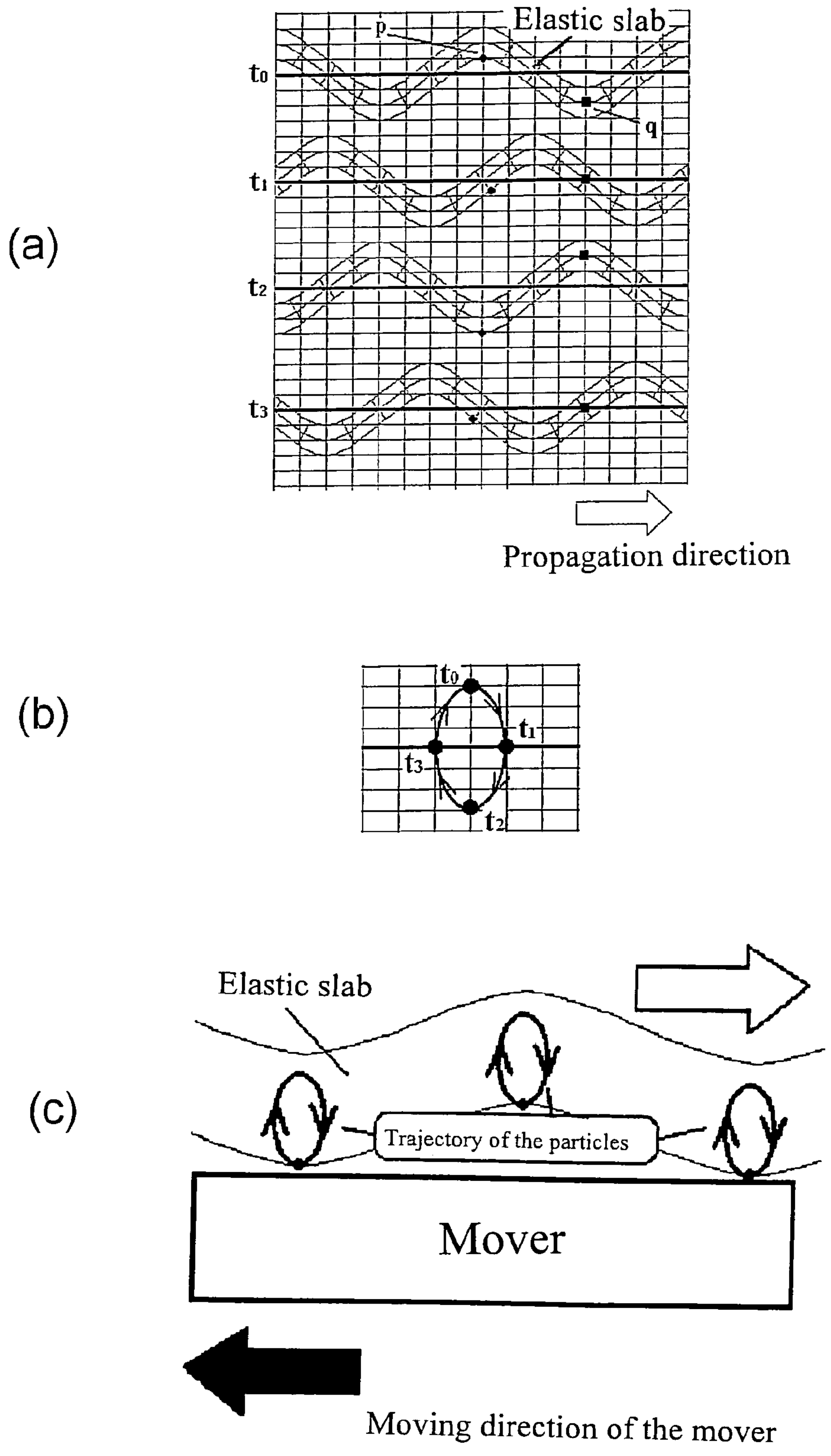
FIG. 1 is a diagram describing the principle of the conventional traveling wave type ultrasonic motor.

FIG. 1 (*a*) expresses the temporal progression of the deformation of the slab as the flexural wave travels from left to right. The initial form of the slab at time t0 is shown in the figure; then, the slab changes its form as time progress as shown. In the figure, t1, t2, t3 correspond to the form of the slab at the time $\pi/2$, $\pi$, $3\pi/2$ seconds later.

When attention is paid to the point on the central line of an elastic body (for example, the point q), it turns out that point q is displaced to the vertical direction only. Next, attention is paid to the surface point (for example, the point p). It turns out that point p is displaced not only vertically but also tangentially. The locus of the displacement of point p is shown FIG. 1 (*b*). Thus the surface elements of the slab move elliptically.

Now, a movable body (mover) is in contact with the slab, and the flexural wave is propagated along the slab, as shown in FIG. 1 (*c*). The movement of the surface particle is transmitted to the mover through frictional forces. The direction of the movement of the mover is opposite to the direction of propagation of the flexural wave.

The Principle of Operation of the Ultrasonic Motor of this Invention

The fundamental composition and the principle of operation of a traveling wave type ultrasonic wave motor of this invention are explained.

Figure 2:
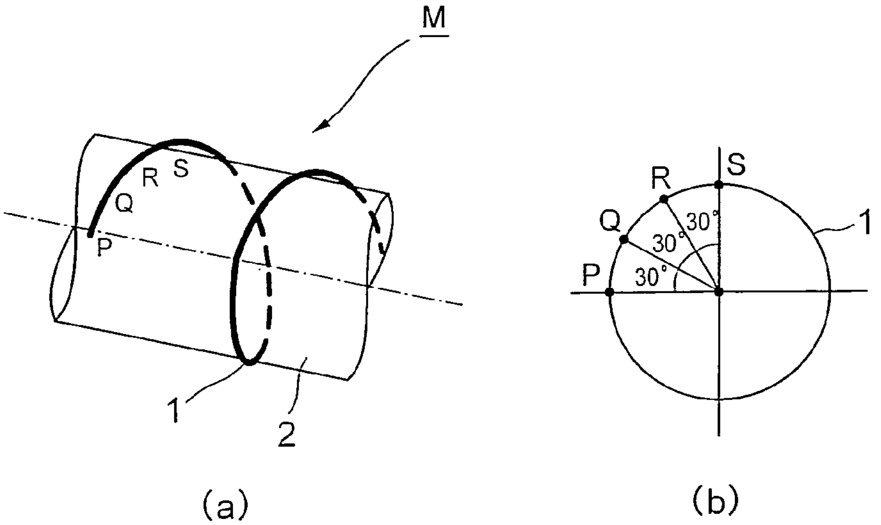
FIG. 2 is a diagram describing the basic system of the invented ultrasonic motor that uses a coiled acoustic waveguide as a stator.

As shown in FIG. 2 (*a*), the motor M of this invention consists of a rotor 2 with a circular cross section, and stator 1 which is an acoustic waveguide in the shape of a helical coil wound around the rotor 2. A spirally coiled acoustic waveguide constructed on a plane can also be used as a stator in some configurations.

Figure 3:
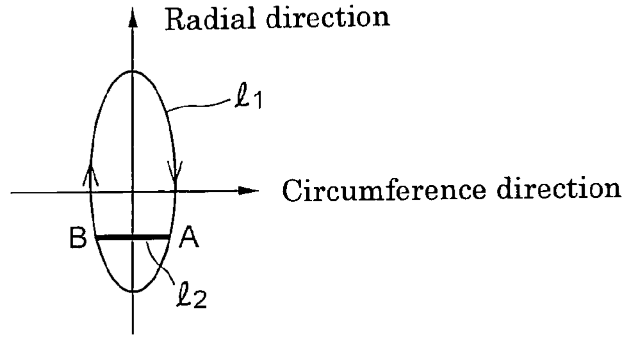
FIG. 3 is a diagram describing the direction of the vibration of the Lamb wave traveling along the coiled acoustic waveguide.

Usually, in any traveling wave type ultrasonic wave motor, it is necessary to move surface particle of the stator elliptically. The coiled waveguide has a finite thickness. Therefore, when the flexural wave progresses along the coiled waveguide, the surface elements of the coiled waveguide move elliptically. Here, as shown in FIG. 2, the point P, Q, R, S are separated at a 30-degree interval as shown in FIG. 2(*b*). The arbitrary point near the surface of the acoustic waveguide 1 (any one point of P, Q, R, S) performs an elliptical movement in concert with the progress of the flexural wave. Note that the main direction of the displacement of the flexural wave is radial, as shown in FIG. 3.

When there is no propagation of a flexural wave, the rotor 2 and the acoustic waveguide 1 are placed in non-contact close proximity. When the flexural wave propagates in the axial direction (from P to Q), the particle at P moves in a clockwise direction as shown in FIG. 3. When the amplitude of the flexural wave is small, the surface element traces the elliptic locus $l_1$. When the amplitude is large, the element traces the line $l_2$ from A to B in FIG. 3, because the element touches the surface of the rotor. Then the element drives the rotor in the counter clockwise direction.

Figure 4:
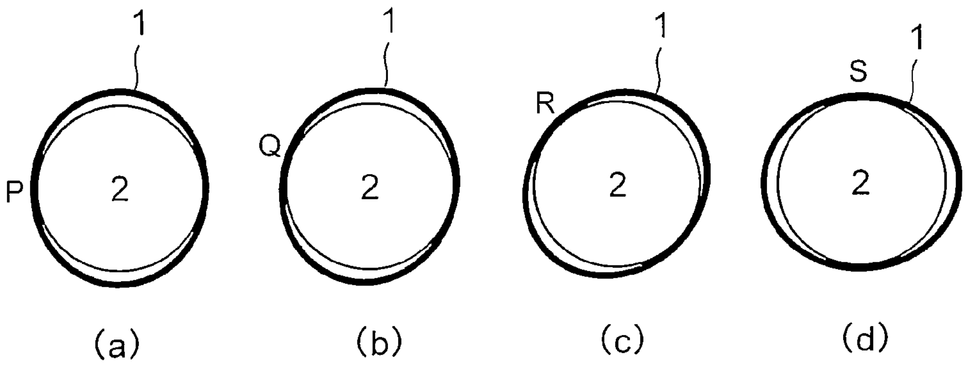
FIG. 4 is a diagram describing the working principle of the invented ultrasonic motor where the particles at the points P, Q, R, S drive the rotor sequentially over time.

Assuming that the wavelength of the flexural wave is equal to the pitch of one turn of the helical coil, the surface elements at P, Q, R, S touch the rotor consecutively as the flexural wave propagates, and cause the rotor to rotate, as shown in FIG. 4. If the element at P and the element at the axisymmetric point drive the rotor at the same time, the rotor is driven without any preload spring. Since the element on the helical coil moves in the axial direction, the rotor can also be driven in the axial direction.

Thus, the invented motor is constructed without using the spring and the absorber, making the motor simple and robust compared to the conventional traveling wave type ultrasonic motor. If the stator is constructed using a coil in a plane, it is necessary to place the coil between two disks.

Any object that has an axial-symmetry such as a rod, a disk, a tube, a cone, or a sphere can be used as a rotor. If a groove is constructed on the surface of the rod, linear displacements of the mover can also be made. The rotor can be made of any solid such as metal or ceramic. However, the choice of material must take wear into account.

The flexural wave considered here is known as the Lamb wave. Use of a thick slab enhances the driving force. Furthermore, the part of the wire must be flattened to enhance the driving force, because the wider contact area enhances the driving force. Any kind of acoustic wave other than the Lamb wave, such as a surface wave, can be used for the coiled stator.

Example 1

Figure 5:
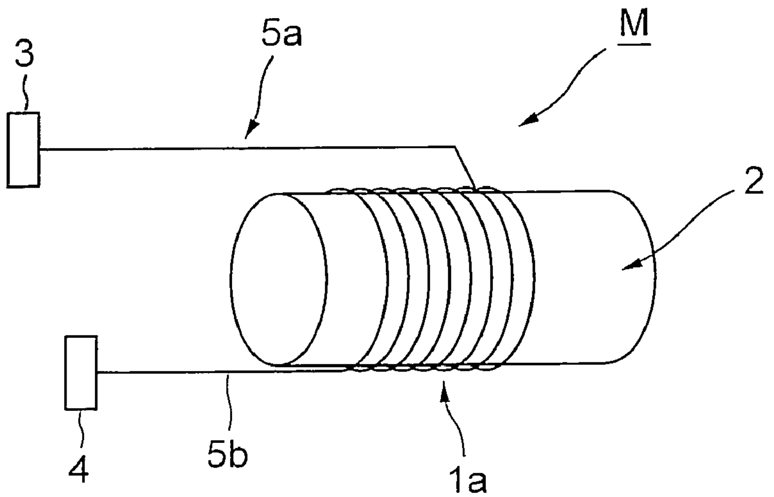
FIG. 5 is a diagram describing the principle of the example 1 of the invented motor that uses the acoustic waveguide in the form of a helical coil as a stator placed outside of the rotor.

FIG. 5 shows the principle of example 1 of the invented traveling wave type ultrasonic motor that uses a coiled waveguide as a stator. The motor consists of transducers 3 and 4, waveguides 5*a* and 5*b*, a rotor 2, and a coiled acoustic waveguide 1*a* wound around the rotor 2.

When an electric voltage is applied to the transducer 3, the flexural wave is excited, and is propagated along the waveguide 5*a* to the coiled acoustic waveguide 1*a*. The propagation of the flexural wave along the coiled acoustic waveguide causes an elliptical orbit of the point on the contact surface of the waveguide. The elliptical motion of the points causes the rotor to rotate in the direction opposite to that of the propagation of the flexural wave via the frictional force between the coiled acoustic waveguide and the rotor. Here every point on the waveguide in the contact region causes a driving force in the same direction. The flexural wave is attenuated as it propagates along the coiled waveguide. Although the driving force per length that is provided by the coiled waveguide is small, the long contact region allows transmission of all the power sent by the waveguide to the rotor 2 less the transmission loss. When the transducer 4 is excited, the rotor 2 rotates in the other direction.

If one transducer is used, the rotor rotates in one direction only. If two transducers are excited at the same time with an appropriate phase difference, or a frequency difference, a standing wave is formed along the coiled waveguide. If the frequency or phase is swept, the standing wave can be moved along the waveguide. Therefore, the operation as a standing wave type ultrasonic motor is possible.

Any materials such as metal, ceramics, sapphire, or fused quartz can be used as a helical coil. A slab, a rod, or a partly flattened rod made of one of these materials may be used as a coiled waveguide.

A motor based on FIG. 5 was manufactured. The flexural wave at a frequency of 50 kHz was propagated along the acoustic waveguides 5*a*, and 5*b*. The acoustic waveguide was constructed using a 0.05mm thin, 1 mm wide nickel plate. The flexural wave progressed along the acoustic waveguides 5*a* or 5*b*, and the helical coil activated the rotor. The rotor was constructed using a 2 mm diameter, 20 mm long aluminum rod. The rotor could be equipped with a fan.

A second motor based on the FIG. 5 was manufactured. In this case only one waveguide was manufactured using a 0.2 mm diameter piano wire. The inner diameter, number of windings, and pitch of the coil were 2.1 mm, 10 turns, and 0.4 mm. Output torque was measured to be 0.1 μN by applying 80 V to the transducer (a Langevin type transducer) at the frequency of 8.8 kHz.

Figure 6:
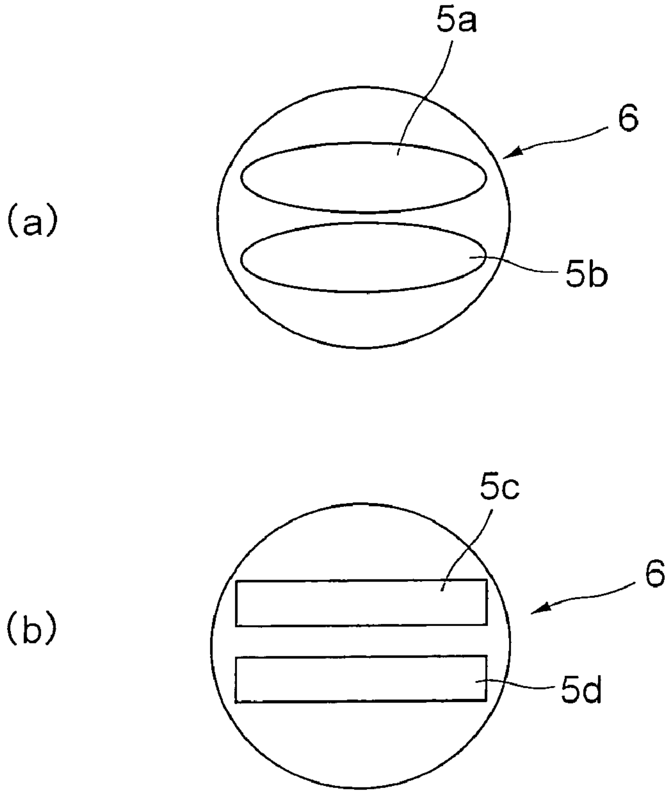
FIG. 6 is a diagram describing the paired acoustic waveguide that transmits the Lamb wave from the transducer to the invented ultrasonic motor.

FIG. 6 shows a diagram describing (a) waveguides 5*a*, 5*b* placed inside a circle member 6, and (b) waveguides 5*c*, 5*d* placed inside a circle member 6 used for the invented motor.

Example 2

Figure 7:
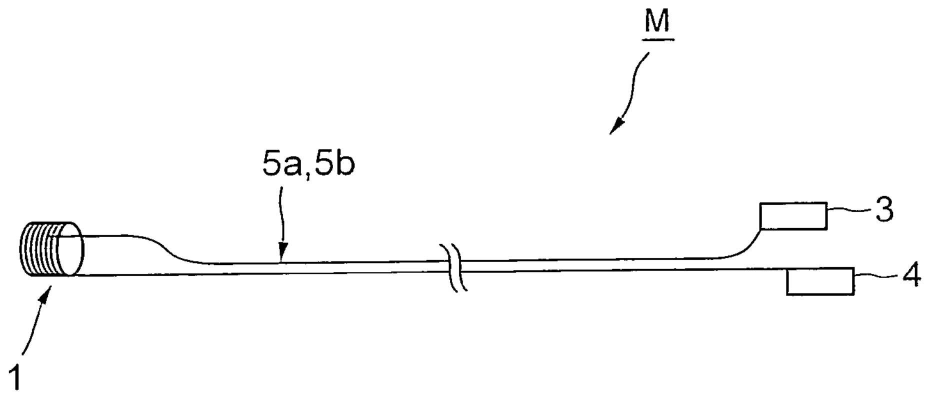
FIG. 7 is a diagram describing the structure of the invented motor shown in example 2 that uses the stator placed outside of the rotor where the two waveguides are used to allow forward and backward rotation.
Figure 8:
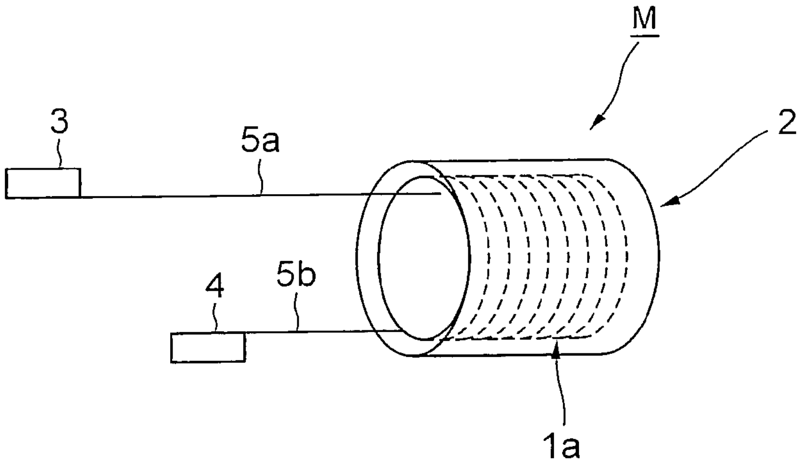
FIG. 8 is a diagram describing another example of the invented motor that uses the stator placed inside of the rotor.

An example of the invented motor is shown in FIG. 7. The motor M consists of paired waveguides 5*a* and 5*b*, a rotor 2, a stator 1*a* placed inside the rotor 2, transducers 3 and 4. In this example, an electric voltage is applied to the transducer 3, and the flexural wave propagates along the waveguide 5*a* to the stator 1*a*. The elliptical movement of the surface element of the stator 1 causes the rotor to rotate as described in Example 1. FIG. 8 shows the enlarged arrangement of the stator 1*a* and the rotor 2.

Figure 9:
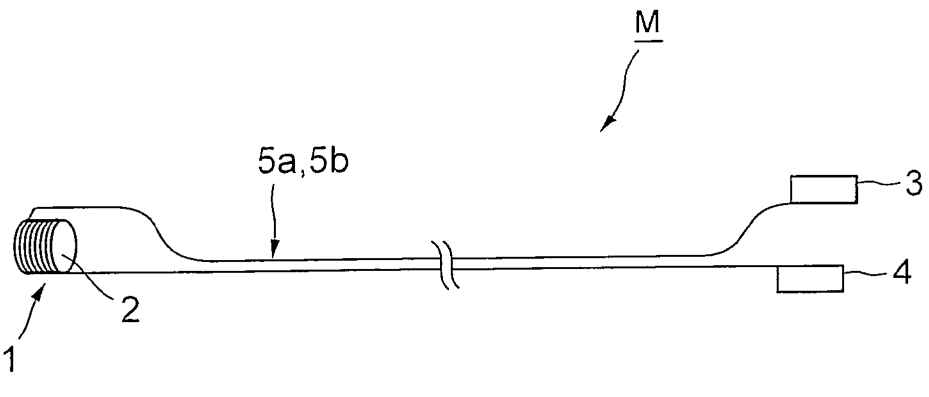
FIG. 9 is a diagram describing the structure of the motor that uses the paired waveguide and the stator placed outside of the rotor.

The stator 1 can also be placed outside the rotor 2 as shown in FIG. 9.

The rotation speed and the torque of the motor depend on the diameters of the acoustic waveguide and the rotor, the amplitude of the flexural wave, and the duration of the pulse if the flexural wave is pulse modulated. Furthermore, a groove on the surface of the rotor modifies the torque and the rotation speed.

A motor based on the FIG. 8 was constructed. In this case, only one waveguide 5*a* made of a 0.2 mm diameter piano wire was constructed. The dimensions of the rotor are 0.7 mm outer diameter, 0.1 mm pitch, and 15 turns of the windings. The dimensions of the rotor are 0.8 mm inner diameter, 1.0 mm outer diameter, and 5 mm length. The motor worked in water.

Thus, the motor could be used in vessel.

Example 3

Figure 10:
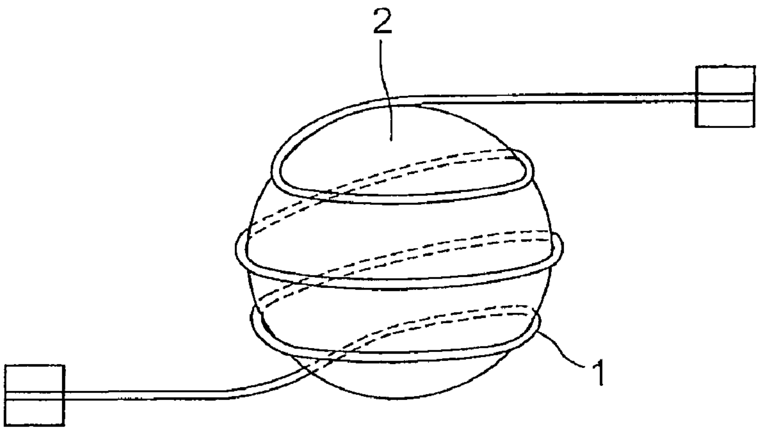
FIG. 10 is a diagram describing the invented motor that uses a sphere or a hollow tube as a rotor.
Figure 10:
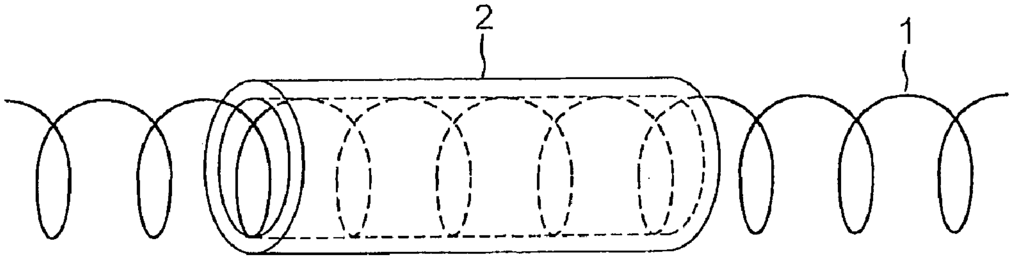

FIG. 10(*a*) is a diagram describing how an axial symmetric body such as a sphere 2 can be rotated by using a coiled waveguide 1 wound around in close external contact with the sphere as shown. FIG. 10(*b*) is a diagram showing that a hollow tube 2 placed in close internal contact with the coil 1 can be moved linearly along the axis of the coil.

Example 4

Figure 11:
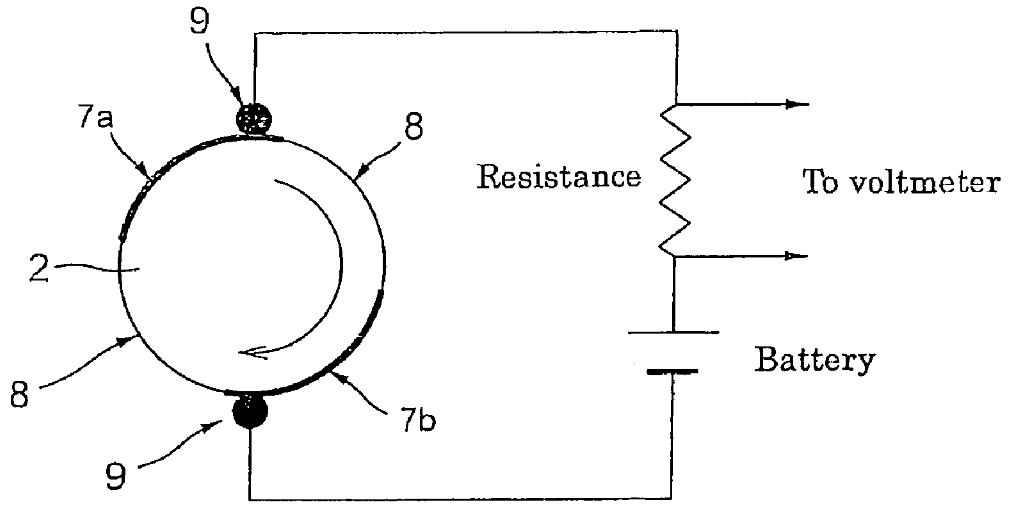
FIG. 11 is a diagram describing the structure of the encoder.
Figure 12:
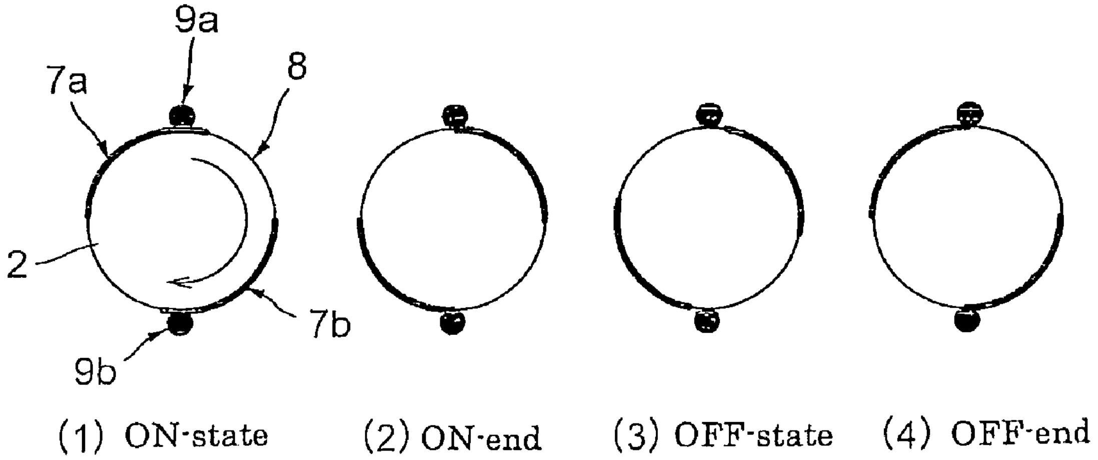
FIG. 12 is a diagram describing the encoder shown in FIG. 11 counting a pulse.
Figure 13:
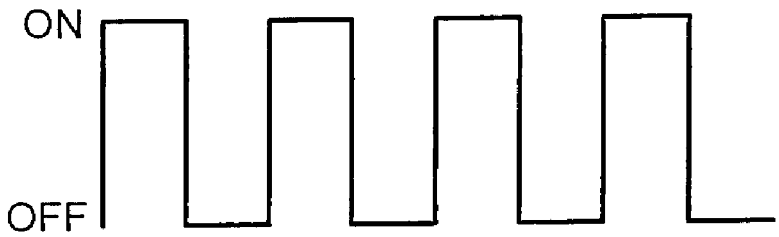
FIG. 13 is a graph that shows the output of the encoder shown in FIG. 11.

An encoder suited to the invented motor is described using FIG. 11 through FIG. 13. In FIG. 11, conductive regions 7*a* and 7*b* (shown by bold lines), and non-conductive region 8 (shown by thin lines) are constructed on the surface of the rotor 2. The conductive regions 7*a* and 7*b* rotate with the rotor 2. Conductive contacts 9 are connected to an electric circuit comprising a resistor and a battery. The conductive regions 7*a* and 7*b* are connected electrically.

In state (1) in FIG. 12, an electric circuit is closed (ON-state), and an electric voltage is produced across the register. State (2) shows the end of the ON-state. State (3) shows the OFF-state, and state (4) shows the end of the OFF state.

An electric pulse as shown in FIG. 13 can be obtained by measuring the voltage across the register, which allows counting the number of rotation of the invented motor.

Example 5

Figure 14:
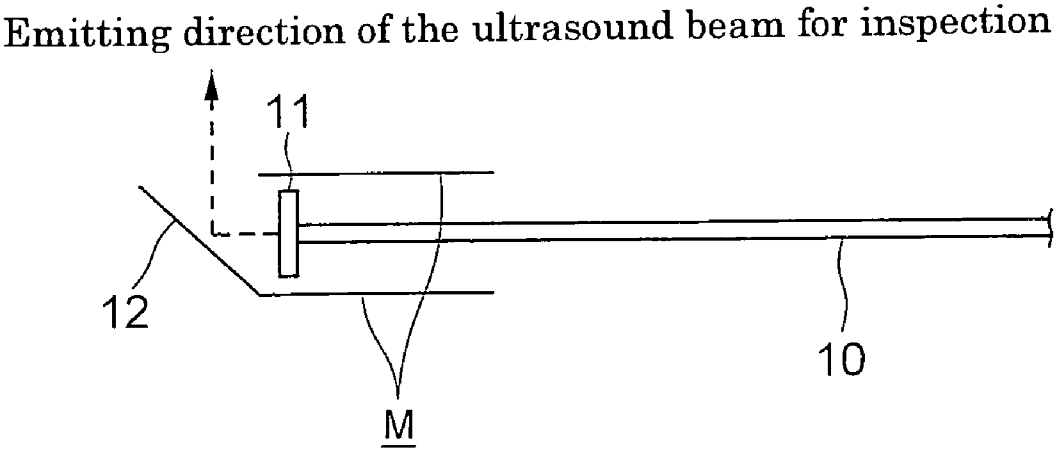
FIG. 14 is a diagram describing the application of the invented motor to ultrasonic endoscopy.

FIG. 14 is a diagram describing the structure of the intravascular ultrasound (IVUS) system that uses a micro-motor. A mechanically rotating IVUS system uses a long flexas (a flexible wire that transmit torque) between the ultrasound element and the motor driving it. Use of a hard catheter is needed for safety, but it hinders the flexibility that is needed in order to scan inside a small vessel. An IVUS system using a micro-motor attached at the tip of the catheter may avoid this problem.

An IVUS using the invented motor can be built as shown in FIG. 14. A reflection mirror 12 for imaging is attached to the rotor. An electrical cable 10 can be placed inside the rotor. The ultrasonic beam emitted from the transducer 11 is steered by the rotation of the mirror 12. Since the motor is small and the rigid region is limited at the top where motor is installed, this IVUS system can be very flexible.

Example 6

Figure 15:
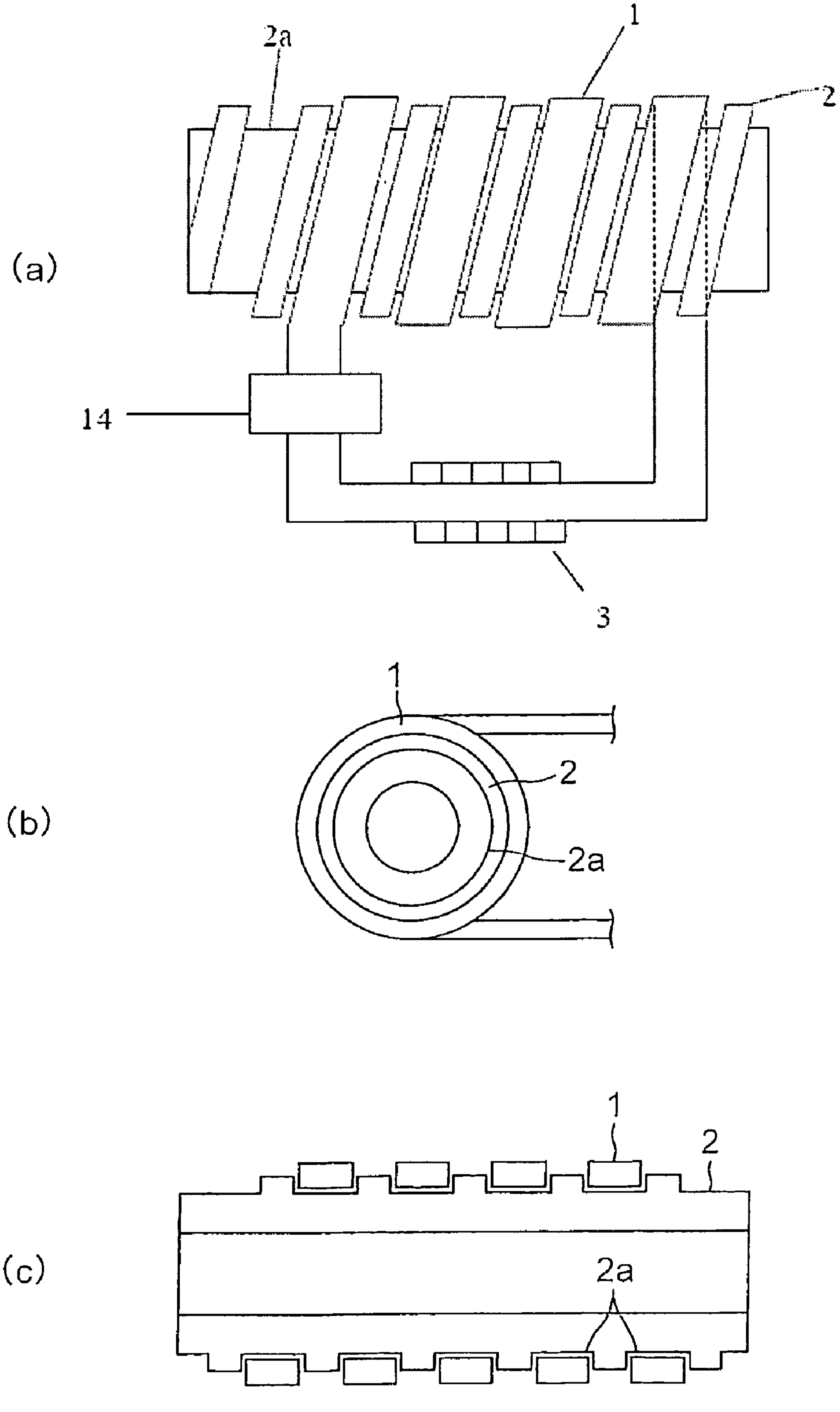
FIG. 15 is a diagram describing the operation of example 6 that enables the mover to move along an axis.

A motor M shown in FIG. 15 can also be used to drive a lens of a small camera. While based on the same principle, in this configuration, the mover 2 is a tube and the coiled stator 1 is an acoustic waveguide that is wound along the groove 2*a* of the mover 2. The coil was made of a 0.5 mm diameter iron wire. The diameter of the tube was 6 mm. When the flexural wave propagates along the waveguide, the elliptical motion of the surface element of the waveguide drives the tube in an axial direction, and the tube is moved in the linear direction. If the flexural wave propagates in the opposite direction, the tube moves in the opposite direction. The experiment was conducted at 50 kHz, with an electric power of 10 W applied to the transducer.

Example 7

Figure 16:
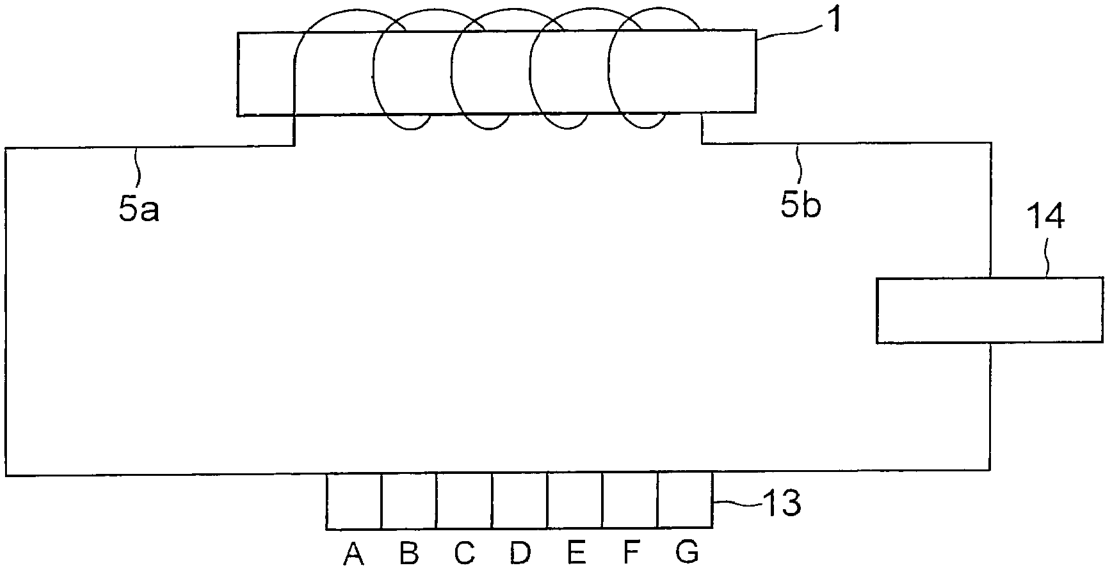
FIG. 16 is a diagram describing an acoustic feed back loop system that enables enhancement of the torque of the motor using a transducer arrangement.

FIG. 16 is a diagram describing a method to enhance the efficiency of the invented motor with a small number of windings. In FIG. 16, an arrayed ultrasonic transducer 13 generates a flexural wave that propagates only in one direction via an acoustic waveguide 5*a*. A part of the flexural wave that is not converted into the rotational motion of the rotor travels back to the arrayed transducer, and is added to the flexural wave that is generated by the transducer in phase. This mechanism enhances the conversion efficiency from the flexural wave power to the rotational power of the motor.

Figure 17:
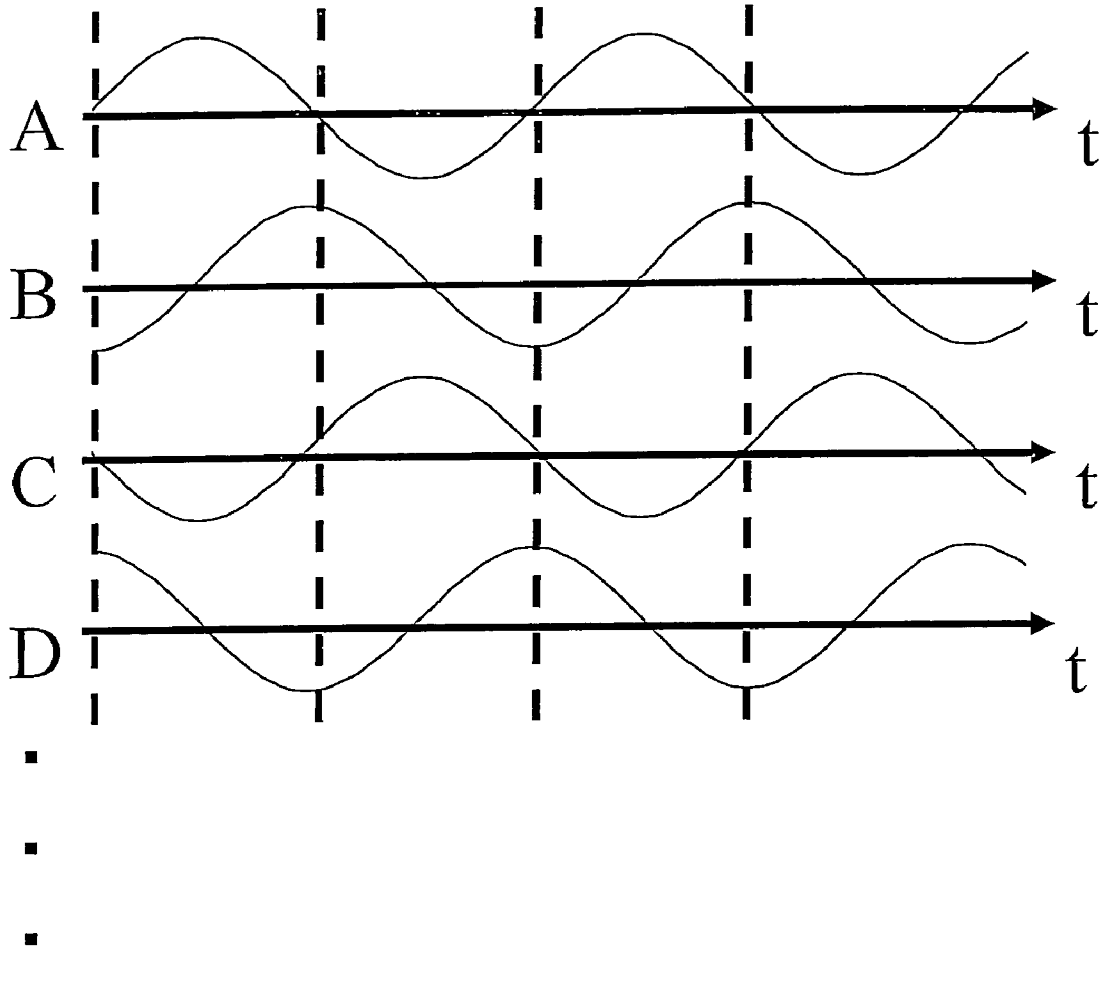
FIG. 17 is a diagram describing a method for generating an ultrasonic wave in a specific direction by activating the transducers with the waveform as shown.

The arrayed transducer 13 consists of small transducers as shown by A, B, C, D, E, F, and G separated appropriately. By applying electric voltages to the transducers as shown in FIG. 17, a flexural wave that propagates one direction is excited.

Figure 18:
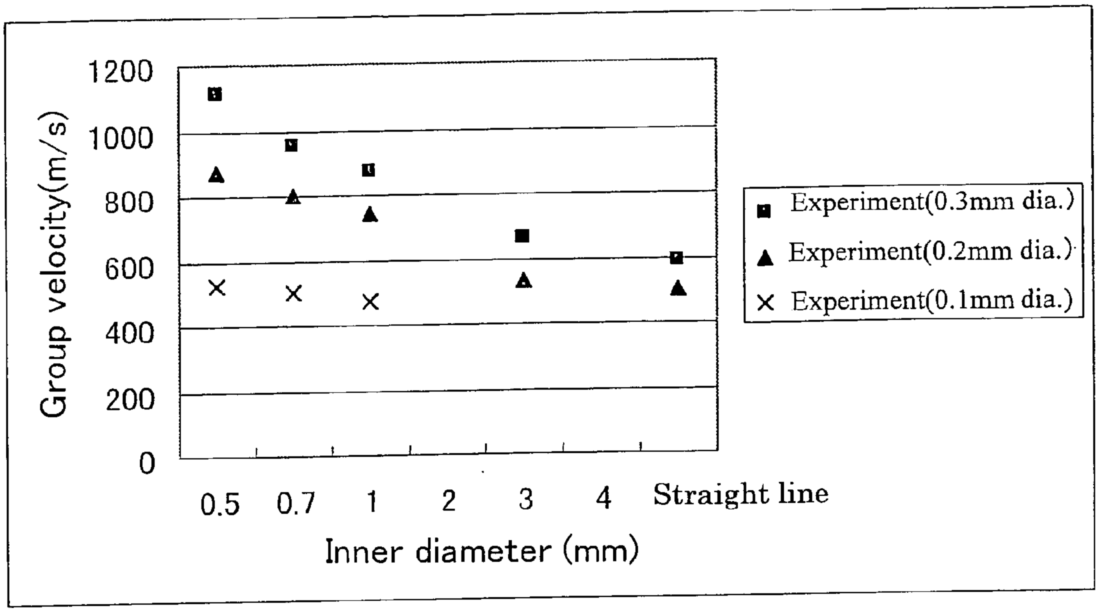
FIG. 18 is a graph showing the group velocity of the flexural wave propagating along the coiled waveguide as a function of the inner diameter.

The phase of the phase equalizer 14, which consists of a coiled waveguide 5*a*, 5*b*, is controlled by the width and the length of the waveguide. FIG. 18 shows a group velocity for coils made of stainless steel wires (0.1 mm, 0.2 mm, and 0.3 mm diameters) as a function of the inner diameter of the coil.

Example 8

Figure 19:
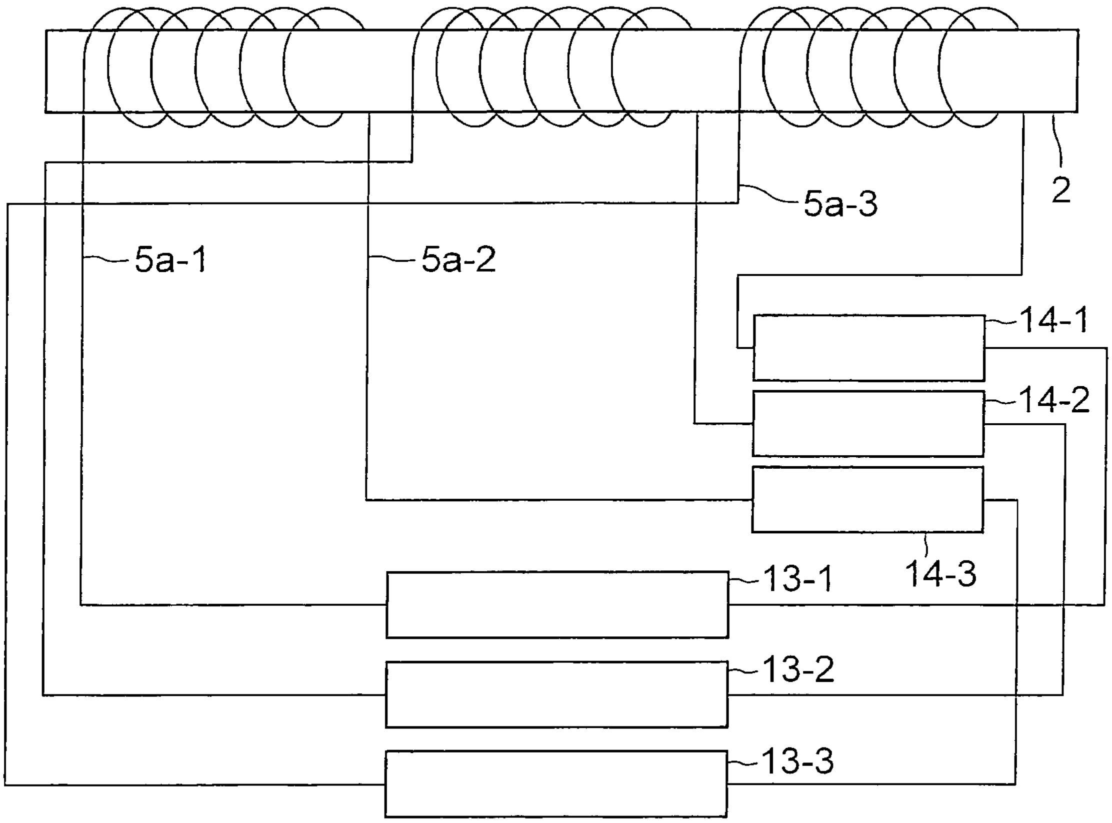
FIG. 19 is a diagram describing how to carry out a series connection of the invented motor.

FIG. 19 shows a diagram describing the series connection of the invented motors to enhance output torque. Flexural waves excited by transducers 13-1, 13-2, and 13-3 drive the rotor 12 to rotate in the same direction via waveguides 5*a*-1, 5*a*-2, and 5*a*-3 with the aid of phase equalizers 14-1, 14-2, and 14-3.

Example 9

Figure 20:
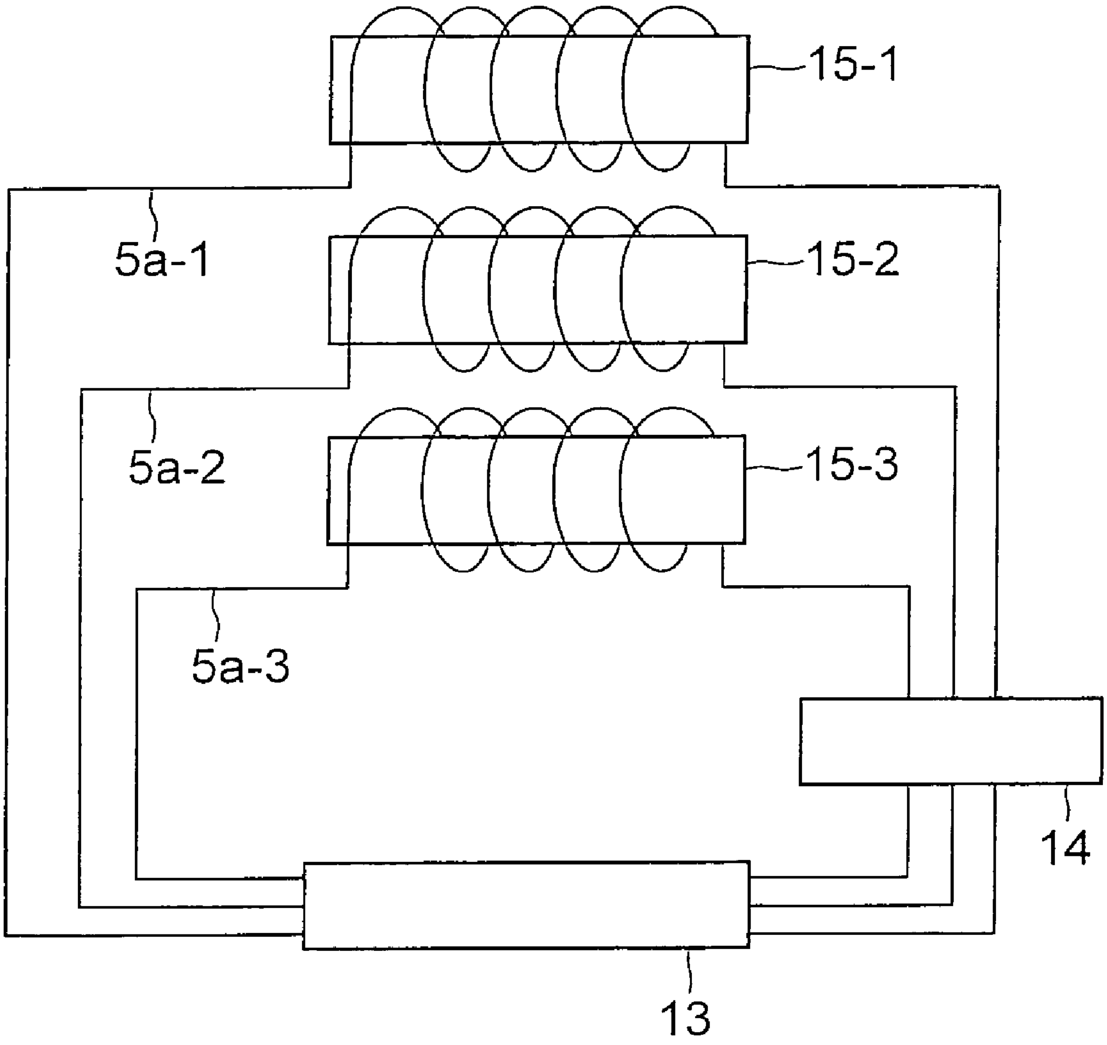
FIG. 20 is a diagram describing how to carry out a parallel connection of the invented motors.

FIG. 20 is a diagram showing the parallel connection of the invented motors. Flexural waves excited by transducer 13 propagate to the motors 15-1, 15-2, and 15-3 via waveguides 15*a*-1, 15*a*-2, and 15*a*-3.

Example 10

Figure 21:
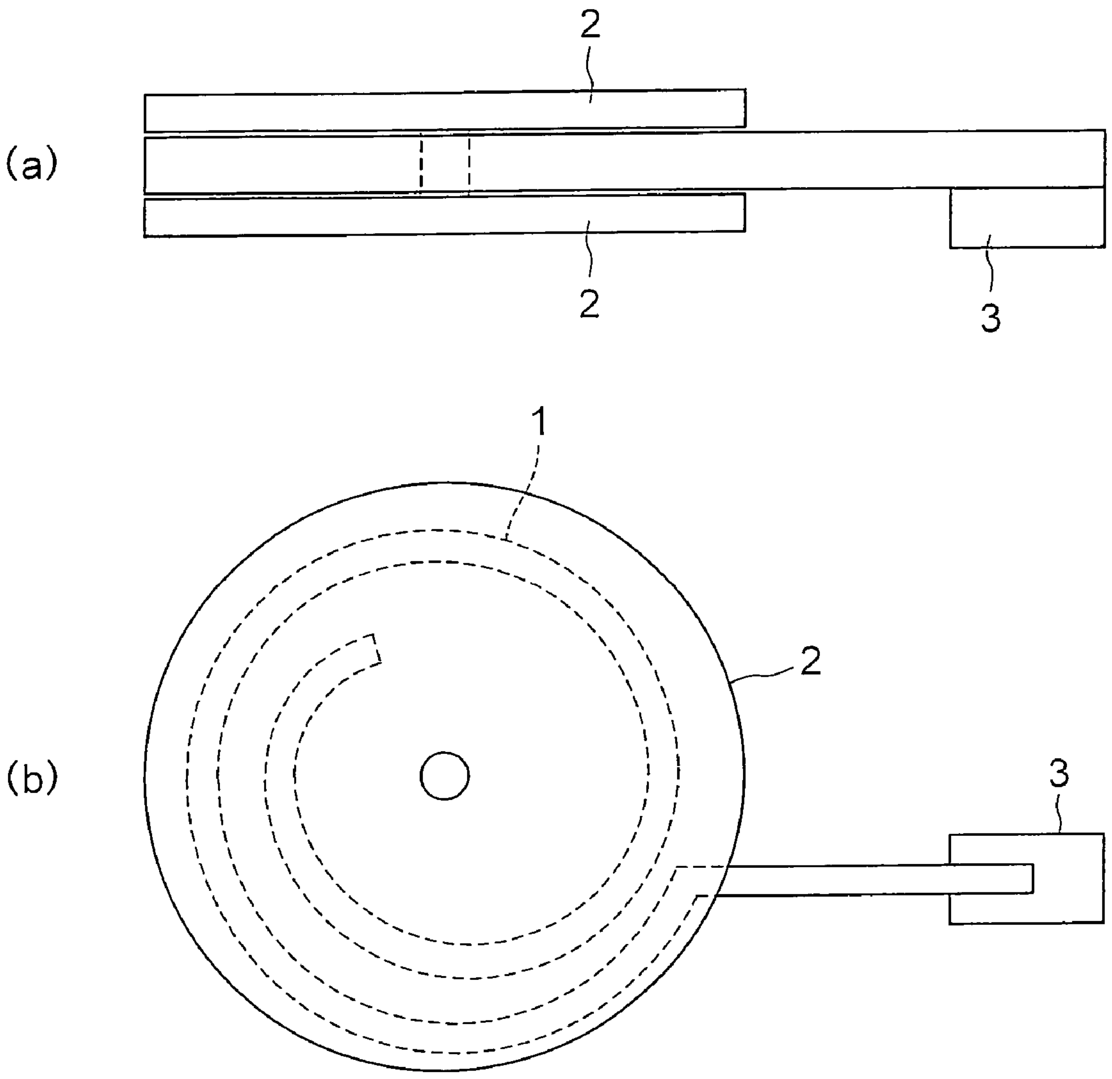
FIG. 21 is a diagram describing the structure of example 10 in an elevational view (a) and in a top view (b).

A disk can be rotated by using a spiral coil in a plane as shown in FIG. 21. In this case, the coil is placed between the disks like a yo-yo. A prototype motor based on FIG. 21 was constructed using a disk with 10-mm diameter, and a coil made of 0.3-mm diameter brass wire. The motor operated at 40 kHz.

As mentioned above, the invented motors or actuators may find many applications in the field of mechanical engineering such as robotics and electric motors, in the field of medicine such as diagnosis and therapy, and in the field of measurement that must be free from electro magnetic interference. In particular, it can be applied in instruments for use in vessels such as an intravascular ultrasound (IVUS) system, or a thrombus removal or prevention device.

What is claimed is:

1. An ultrasonic motor comprising: a stator in the form of a coil constructed from a waveguide; a mover placed in close proximity to, or in close contact with the stator; and a traveling flexural wave generator which generates a traveling flexural wave in the stator so that the mover is driven by the traveling flexural wave.

2. The ultrasonic motor according to claim 1, wherein the stator is in the form of a helical coil or a spiral coil in a plane.

3. The ultrasonic motor according to claim 1, wherein the stator is made of a nano-carbon coil.

4. The ultrasonic motor according to claim 1, wherein the mover is a rotor with a circular cross section.

5. The ultrasonic motor according to claim 1, wherein the flexural wave is generated by a transducer placed apart from the mover, so that the flexural wave travels in the stator.

6. The ultrasonic motor according to claim 1, wherein the traveling flexural wave that drives the mover to be moved is generated by shifting a standing wave that is generated by superposing two traveling flexural waves that are generated by two transducers.

7. The ultrasonic motor according to claim 1, wherein the waveguide is made of any kind of metals, ceramics, fused quartz, or sapphire, and a cross section thereof is square, circular, or partly circular.

8. The ultrasonic motor according to claim 1, wherein the mover has a diagonal groove.

9. The ultrasonic motor according to claim 1, wherein an encoder is constructed using an electrically conductive layer and an electrically-insulated layer formed on the surface of said mover.

10. The ultrasonic motor according to claim 1, wherein any axisymmetric body is rotated by the three dimensionally constructed stator that is wound around said axisymmetric body.

11. The ultrasonic motor according to claim 1, wherein a liquid layer is provided between said mover and said stator.

12. The ultrasonic motor according to claim 1, wherein a tube is used as said mover, and said helical coil wound inside or outside said mover is used as a stator.

13. The ultrasonic motor according to claim 1, wherein the mover is made of two disks, and the stator in shape of a flat coil is provided therebetween.

14. An ultrasonic motor comprising:

a motor including a stator in the form of a coil constructed from a waveguide, a mover placed in close proximity to, or in close contact with the stator, and a traveling flexural wave generator which generates a traveling flexural wave in the stator so that the mover is driven by the traveling flexural wave, an arrayed transducer, and an acoustic phase shifter, where the motor, the arrayed transducer and the phase shifter form an acoustic closed circuit.

15. The ultrasonic motor according to claim 1, wherein there is a series/parallel connection of said motors and acoustic phase shifters.

16. An ultrasonic imaging system comprising:

a motor including a stator in the form of a coil constructed from an acoustic waveguide, a mover placed in close proximity to, or in close contact with said stator, and a flexural wave generator which generates a flexural wave traveling in said stator so that the mover is driven by the traveling flexural wave.

17. The ultrasonic imaging system according to claim 16, wherein said motor has incorporated therewith an encoder constructed using an electrically conductive layer and an electrically-insulated layer formed on the surface of said mover.

18. An ultrasonic motor comprising:

an open end member having an end;

a mover, wherein the open end member is wound around the mover; and a flexural wave generator which generates a flexural wave, wherein the flexural wave generator is connected to the end of the open end member so that the flexural wave generated by the flexural wave generator travels in the open end member, whereby the stator which is brought into contact or is in contact with the mover moves the mover by the flexural wave which travels along the open end member.

19. An ultrasonic motor comprising:

a stator in the form of a coil constructed from a waveguide;

a mover which is inserted in or surrounds the stator in the form of a coil; and a flexural wave generator which generates a flexural wave traveling in the stator so that the stator which is brought in contact or is in contact with the mover, moves the mover by the traveling flexural wave which travels in the stator.

* * * * *